United States Patent
Kolcarek et al.

(10) Patent No.: US 12,451,116 B2
(45) Date of Patent: Oct. 21, 2025

(54) SYSTEM AND METHOD FOR ENHANCED PLAYBACK OF AIR TRAFFIC CONTROL COMMUNICATION

(71) Applicant: HONEYWELL INTERNATIONAL INC., Charlotte, NC (US)

(72) Inventors: Pavel Kolcarek, Brno (CZ); Robert De Mers, Plymouth, MN (US); Tor Finseth, Plymouth, MN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 122 days.

(21) Appl. No.: 18/475,957

(22) Filed: Sep. 27, 2023

(65) Prior Publication Data

US 2025/0104691 A1   Mar. 27, 2025

(51) Int. Cl.
| | | |
|---|---|---|
| G10L 13/027 | (2013.01) |
| G06F 3/16 | (2006.01) |
| G08G 5/20 | (2025.01) |
| G08G 5/21 | (2025.01) |
| G08G 5/23 | (2025.01) |
| G08G 5/24 | (2025.01) |
| G08G 5/26 | (2025.01) |
| G10L 21/003 | (2013.01) |
| G10L 21/02 | (2013.01) |
| G10L 21/0208 | (2013.01) |
| G11B 27/031 | (2006.01) |

(52) U.S. Cl.
CPC .............. *G10L 13/027* (2013.01); *G08G 5/20* (2025.01); *G08G 5/21* (2025.01); *G08G 5/23* (2025.01); *G08G 5/24* (2025.01); *G08G 5/26* (2025.01); *G10L 21/003* (2013.01); *G10L 21/02* (2013.01); *G10L 21/0208* (2013.01); *G06F 3/165* (2013.01); *G11B 27/031* (2013.01)

(58) Field of Classification Search
CPC ... G11B 27/031; G06F 3/165; G10L 21/0208; G10L 21/02; G10L 21/003; G08G 5/00; G08G 5/20; G08G 5/21; G08G 5/26; G08G 5/24; G08G 5/23
See application file for complete search history.

(56) References Cited

U.S. PATENT DOCUMENTS 7,774,202 B2   8/2010   Spengler et al.
8,515,763 B2   8/2013   Dong et al.
(Continued)

FOREIGN PATENT DOCUMENTS

CN   113948091 A   1/2022

*Primary Examiner* — Samuel G Neway
(74) *Attorney, Agent, or Firm* — Ingrassia Fisher & Lorenz, LLP

(57) ABSTRACT

A method and system for providing playback of air traffic control (ATC) communications for a pilot of an aircraft has been developed. First, an audio communication is received from the ATC for the pilot of the aircraft. The audio communication is segmented into three separate audio channels including: a raw channel of the audio communication as received, an enhanced channel of a filtered version of the audio communication, and a synthesized channel of a speech synthesized version of the audio communication. An identification function identifies segments of each audio communication with reference to identifying data for the aircraft. The separate audio channels are then stored in an electronic memory for later retrieval by the pilot of the aircraft.

17 Claims, 4 Drawing Sheets

(56) References Cited

U.S. PATENT DOCUMENTS

| | | |
|---|---|---|
| 9,082,414 B2 | 7/2015 | Talwar et al. |
| 9,135,916 B2 | 9/2015 | Nutaro et al. |
| 9,263,039 B2 | 2/2016 | Di Cristo et al. |
| 9,697,818 B2 | 7/2017 | Hendrickson et al. |
| 10,403,299 B2 * | 9/2019 | Wung ................. G10L 21/0272 |
| 11,621,002 B2 | 4/2023 | Delpech |
| 2002/0107694 A1 | 8/2002 | Lerg |
| 2012/0010887 A1 | 1/2012 | Boregowda et al. |
| 2014/0244246 A1 * | 8/2014 | Nutaro .................... G10L 15/26 704/226 |
| 2015/0100311 A1 * | 4/2015 | Kar ......................... G10L 15/07 704/231 |
| 2016/0093302 A1 * | 3/2016 | Bilek ...................... G10L 15/26 704/235 |
| 2016/0202950 A1 * | 7/2016 | Hawley ..................... G08G 5/21 700/94 |
| 2017/0186463 A1 * | 6/2017 | Prins ....................... G11B 20/22 |
| 2017/0287467 A1 | 10/2017 | Lafon et al. |
| 2019/0392852 A1 * | 12/2019 | Hijazi ..................... G06N 3/084 |
| 2020/0380958 A1 * | 12/2020 | Srinivasan ............... G08G 5/76 |
| 2021/0020168 A1 * | 1/2021 | Dame ..................... G10L 15/22 |
| 2021/0183355 A1 * | 6/2021 | Cho ....................... H04R 1/025 |
| 2022/0267023 A1 | 8/2022 | Baladhandapani et al. |
| 2022/0382907 A1 | 12/2022 | Siohan et al. |
| 2022/0383879 A1 * | 12/2022 | Agarwal ................... G06F 3/14 |
| 2025/0104691 A1 * | 3/2025 | Kolcarek ................ G08G 5/21 |

* cited by examiner

SYSTEM AND METHOD FOR ENHANCED PLAYBACK OF AIR TRAFFIC CONTROL COMMUNICATION

STATEMENT REGARDING GOVERNMENTAL SPONSORED RESEARCH OR DEVELOPMENT

The project leading to this application has received funding from the Clean Sky 2 Joint Undertaking (JU) under grant agreement No 945583. The JU receives support from the European Union's Horizon 2020 research and innovation programme and the Clean Sky 2 JU members other than the Union.

TECHNICAL FIELD

The present invention generally relates to avionics communications and more particularly relates to a system and method for enhanced playback of air traffic control (ATC) communication.

BACKGROUND

Communication tasks are demanding for aircraft pilots, especially in busy airspaces and near big airports. The pilot is required to spend extra effort focusing attention to listen and to filter out channel noise which takes away attention from other tasks. Radio communication is often noisy and pilots must ask air traffic control (ATC) to repeat instructions. Other problems involve accent, pitch, pronunciation, and bitrate. Additionally, non-native English speakers or less experienced pilots have difficulties understanding rapid paced ATC communications. The demands of noisy communication may increase frequency of mistakes. Hence, there is a need for a system and method for enhanced playback of ATC communication.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for providing playback of air traffic control (ATC) communications for a pilot of an aircraft. The method comprises: receiving an audio communication from the ATC for the pilot of the aircraft; segmenting the audio communication into three separate audio channels, the audio channels comprising, a raw channel comprising the audio communication as received, an enhanced channel comprising a filtered version of the audio communication, and a synthesized channel comprising a speech synthesized version of the audio communication; identifying each audio channel with reference to identifying data for the aircraft; and storing the separate audio channels in an electronic memory for later retrieval by the pilot of the aircraft.

A system is provided for providing playback of air traffic control (ATC) communications for a pilot of an aircraft. The system comprises: a communication device located onboard the aircraft that receives an audio communication from the ATC for the pilot of the aircraft; a computing device located onboard the aircraft that segments the audio communication into three separate audio channels, the audio channels comprising, a raw channel comprising the audio communication as received, an enhanced channel comprising a filtered version of the audio communication, and a synthesized channel comprising a speech synthesized version of the audio communication; an identification function comprising that references each segment of an audio channel with identifying data for the aircraft; and a system memory that stores the separate audio channels in an electronic memory for later retrieval by the pilot of the aircraft.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for providing playback of air traffic control (ATC) communications for a pilot of an aircraft has been developed. First, an audio communication is received from the ATC for the pilot of the aircraft. The audio communication is segmented into three separate audio channels including: a raw channel of the audio communication as received, an enhanced channel of a filtered version of the audio communication, and a synthesized channel of a speech synthesized version of the audio communication. An identification function identifies segments of each audio communication with reference to identifying data for the aircraft. The separate audio channels are then stored in an electronic memory for later retrieval by the pilot of the aircraft.

Figure 1:
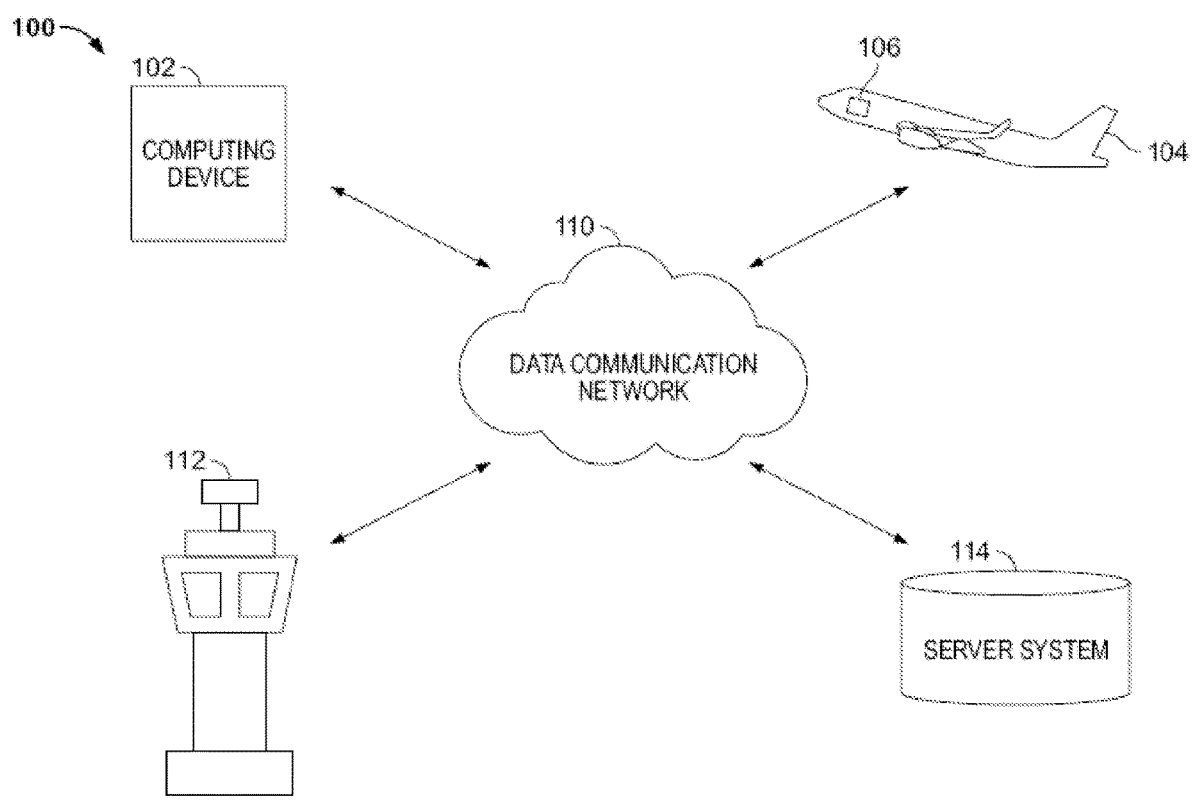
FIG. 1 is a diagram of an aircraft communication system in accordance with the disclosed embodiments.

Turning now to the figures, FIG. 1 is a diagram of a system 100 in accordance with the disclosed embodiments. The system 100 operates with a current flight of the aircraft 104. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application.

The aircraft 104 may be any aviation and may be implemented as an airplane, helicopter, spacecraft, hovercraft, or the like. The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
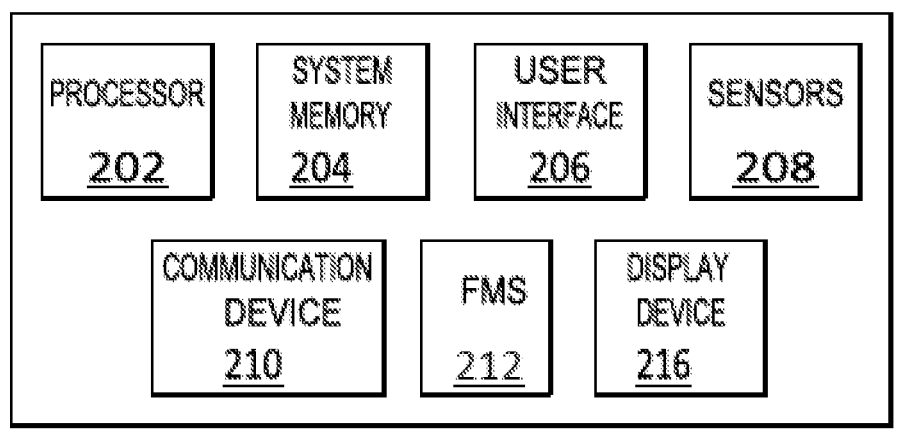
FIG. 2 is a functional block diagram of an aircraft computing device in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device

200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Present embodiments of the disclosed method and system provide for the selection and playback of the last utterance from ATC to a pilot with varying degrees of speech improvement. The system duplicates incoming ATC communication into separate audio streams that can enhance and/or synthesize the ATC speech into a form that is understandable to the pilot and stores the enhanced speech communications according to the aircraft callsign in list for future playback. The pilot can access raw, enhanced, or synthesized ATC communication, as well as select past audio clips of the ATC instructions for the aircraft (but not other aircraft). The raw ATC audio is still streamed to the pilot's audio headset, but the pilot can select which saved files to playback from a Human Machine Interface (HMI).

Figure 3:
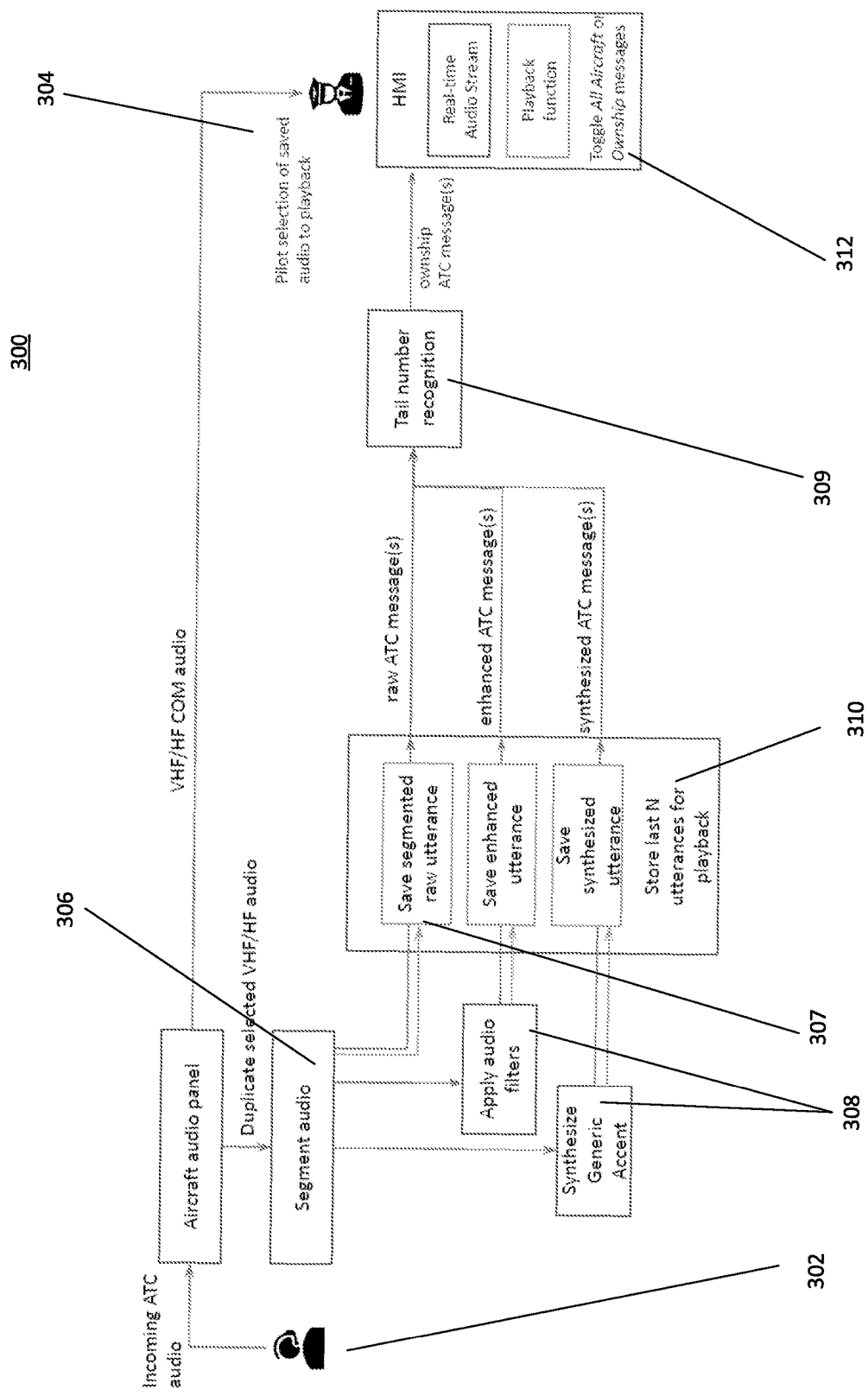
FIG. 3 is a block diagram of system for providing playback of air traffic control (ATC) communications for a pilot of an aircraft.

Turning now to FIG. 3, a block diagram 300 is shown of a system for providing playback of ATC communications for a pilot of an aircraft. The incoming ATC VHF audio 302 is segmented 306 into individual utterances and split into three separate streams: raw utterances 308; enhanced utterances 308; and speech synthesis of generic accent 308. The system provides real time streaming the audio on all channels, but also simultaneously saving segments for playback 310. For example, this would allow the pilot to stream a converted accent, but then select certain enhanced or raw segments for playback and vice versa.

Specifically, the duplication of the VHF/HF audio ensures that there is no safety risk since the pilot still has full control over the original communications. The raw segment is not enhanced but just segmented into individual utterances. This may be done using a voice activity detection (VAD) algorithm which isolates the correct boundaries of the utterance. The enhanced utterances have various filters applied as noise reduction, voice clarification, speed reduction, conversion to a better spectrum, speaker diarization which filters out pilot replies, etc. These filters may be configured as needed. The synthesized utterances apply a functionality for accent conversion. In other embodiments, the synthesized utterances may apply a speech translation function (e.g., receive ATC audio in Korean and provide a real time translation into English). The tail number/callsign recognition 309 uses a speech decoder (e.g., keyword detection) that allows storage of all of the audio channels and segments with reference to the aircrafts tail number and or callsign. The streams are saved 310 in an electronic database or other suitable electronic memory storage medium and made available to the pilot for playback 304 using an HMI with a playback function 312. The playback function 312 of the HMI will allow the pilot to select if they want to hear all communication for the airspace, or just the audio specific to their own aircraft.

During operations, the enhancement/synthesis is done for every message from ATC which are then stored for potential use and played upon request. If the pilot misheard the ATC call or did not understand, instead of calling back (e.g., "please say again"), he can push a button and replay the last utterance or select the misheard message from a menu. The raw, enhanced, and synthesized audio may also be provided together as a safety measure in case there is a speech recognition error in either the enhanced or synthetized streams. The pilot can confirm that the enhanced/synthesized audio is correct in comparison to the raw saved audio. In some embodiments, the pilot can indicate if a enhanced or synthesized audio is wrong, thereby providing feedback allowing the system to correct the error. The settings will then be applied to future ATC messages. This could be automatic, or the settings manually saved by the pilot.

It should be clear that advantages of embodiments of the system include reducing the number of repeated ATC messages, reducing the instances of "communication noise over VHF" (i.e., too much communication near busy airports) by using playback, reducing mistakes by the pilot and improving intelligibility of the instructions for the pilot. This makes for faster input for the pilot and a corresponding faster response for an easier and safer communication flow.

Figure 4:
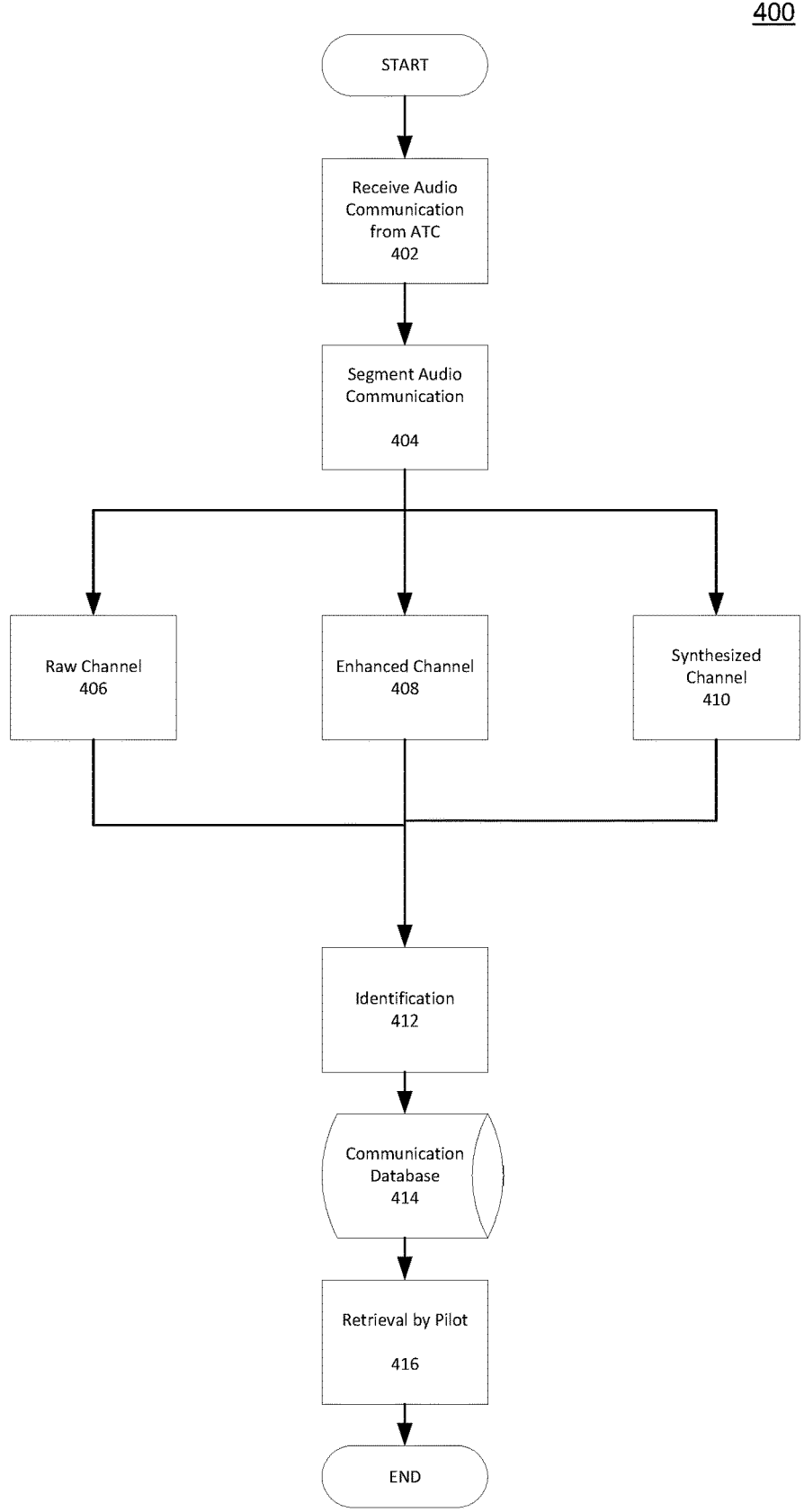
FIG. 4 is a flowchart of a method for providing playback of air traffic control (ATC) communications for a pilot of an aircraft.

Turning now to FIG. 4, a flowchart 400 is shown of a method for providing playback of air traffic control ATC communications for a pilot of an aircraft. First, an audio communication is received from the ATC 402 for the pilot of the aircraft. The audio communication is segmented into three separate audio channels 404 including: a raw channel 406 of the audio communication as received, an enhanced channel 408 of a filtered version of the audio communication, and a synthesized channel 410 of a speech synthesized version of the audio communication. Next, an identification function 412 uses a speech decoder (e.g., keyword detection) to identify and store all of the audio channels and segments with reference to the aircrafts tail number and or callsign. The separate audio channels are stored in an communications database 414 or other suitable electronic memory for later retrieval by the pilot of the aircraft 416.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing playback of air traffic control (ATC) communications for a pilot of an aircraft, comprising:
   receiving an audio communication from the ATC for the pilot of the aircraft;
   segmenting the audio communication into three separate audio channels, the audio channels comprising,
      a raw channel comprising the audio communication as received,
      an enhanced channel comprising a filtered version of the audio communication, and
      a synthesized channel comprising a speech synthesized version of the audio communication;
   identifying each audio channel with reference to identifying data for the aircraft; and
   storing the separate audio channels in an electronic memory for later retrieval by the pilot of the aircraft.

2. The method of claim 1, further comprising:
   saving a copy of the audio communication to the electronic memory prior to segmenting the audio communication.

3. The method of claim 1, where the raw channel of the audio communication has been divided with voice segmentation that isolates the boundaries of each audio utterance.

4. The method of claim 1, where the filtered channel of the audio communication has been enhanced with a noise reduction filter.

5. The method of claim 1, where the filtered channel of the audio communication has been enhanced with filtering out replies by the pilot.

6. The method of claim 1, where the synthesized channel of the audio communication has been enhanced by converting voice accents into a generic accent.

7. The method of claim 1, where the identification channel of the audio communication has been enhanced by attaching the tail number or callsign of the aircraft to the audio communication.

8. The method of claim 1, where the separate audio channels are stored according to the identifying data for the aircraft.

9. A system for providing playback of air traffic control (ATC) communications for a pilot of an aircraft, comprising:
   a communication device located onboard the aircraft that receives an audio communication from the ATC for the pilot of the aircraft;
   a computing device located onboard the aircraft that segments the audio communication into three separate audio channels, the audio channels comprising,
      a raw channel comprising the audio communication as received,
      an enhanced channel comprising a filtered version of the audio communication, and
      a synthesized channel comprising a speech synthesized version of the audio communication;
   an identification function comprising that references each segment of an audio channel with identifying data for the aircraft; and
   a system memory that stores the separate audio channels in an electronic memory for later retrieval by the pilot of the aircraft.

10. The system of claim 9, where a copy of the audio communication is saved to the electronic memory prior to segmenting the audio communication.

11. The system of claim 9, where the raw channel of the audio communication has been divided with voice segmentation that isolates the boundaries of each audio utterance.

12. The system of claim 9, where the filtered channel of the audio communication has been enhanced with a noise reduction filter.

13. The system of claim 9, where the filtered channel of the audio communication has been enhanced with filtering out replies by the pilot.

14. The system of claim 9, where the synthesized channel of the audio communication has been enhanced by converting voice accents into a generic accent.

15. The system of claim 9, where the synthesized channel of the audio communication has been enhanced by providing a real time translation of the audio communication.

16. The system of claim 9, where the identification channel of the audio communication has been enhanced by attaching the tail number or callsign of the aircraft to the audio communication.

17. The system of claim 9, where the separate audio channels are stored according to the identifying data for the aircraft.

\* \* \* \* \*